Patented Sept. 1, 1936

2,052,881

UNITED STATES PATENT OFFICE 2,052,881

PURIFICATION OF ALCOHOLS

Kenneth H. Klipstein, Short Hills, and Arthur A. Ticknor, Plainfield, N. J., assignors to The Calco Chemical Co. Inc., Bound Brook, N. J., a corporation of Delaware No Drawing. Application May 18, 1935, Serial No. 22,220

15 Claims. (Cl. 260—103)

Many alcohols such as phenylethyl alcohol are used in the manufacture of perfumes or for other purposes, in which minute quantities of impurities may have a serious effect on the odor of the alcohol. Such alcohols, therefore, require very elaborate purification, because the odor may be affected by extremely small traces of strong smelling impurities.

Phenylethyl alcohol may be made synthetically by a Friedel-Crafts reaction from benzene and ethylene oxide, using aluminum chloride for the synthesis. This process produces certain by-products, some of which appear to be esters and other hydrocarbons such as dibenzyl. These impurities seriously affect the odor of phenylethyl alcohol, making it in some cases unsuitable for use in perfumes.

There are many methods of purifying phenylethyl alcohol, most of which have certain serious disadvantages. One method proposes the formation of addition compounds with calcium chloride. Another method involves the formation of a phthalic acid ester with subsequent steam distillation, and hydrolysis of the phthalic ester by alkali. The calcium chloride method is very unwieldy and does not completely remove impurities. The steam distillation process tends to hydrolyze the phthalic acid ester or its salt, with the resulting loss of phenylethyl alcohol. Hydrocarbons which may be present, such as dibenzyl, are also not satisfactorily removed by distillation.

According to the present invention, we have found that when phenylethyl alcohol and its impurities are dissolved in a proper vehicle, such as for example, toluene, benzene or other hydrocarbons or other organic solvents, the alcohol can be converted into the phthalic acid half ester which is soluble in the vehicle and then precipitated as an insoluble salt, which is removed by filtration. In order to operate satisfactorily, the process must remain anhydrous as the introduction of water is undesirable. This necessitates precipitation of the ester by means of an anhydrous base and it has been found that anhydrous ammonia is most satisfactory. No water is introduced into the system and a water-free phenylethyl alcohol ester salt is recovered.

The process is, of course, applicable to the purification of other alcohols which form half esters of phthalic or similar acids capable of being precipitated in the form of their anhydrous salts. Other polybasic acids may, of course, be used such as for example, oxalic, maleic, fumaric, succinic, adipic and the like, provided they or their anhydrides are capable of reacting with the alcohol under anhydrous conditions. Phthalic anhydride is one of the cheapest dibasic anhydrides and gives the best results with phenylethyl alcohol, permitting a clean, complete separation from impurities. Instead of using ammonia, of course, other anhydrous amines forming hydrocarbon insoluble salts may be employed, preferably those which are either gaseous or soluble in the organic solvent for the alcohol to be purified.

The invention will be described in conjunction with the following specific examples, showing the purification of phenylethyl alcohol but it should be noted that the invention is not limited to the ingredients therein set forth.

Example 1

24.4 parts by weight of crude synthetic phenylethyl alcohol are dissolved in 500 to 600 parts of dry toluene. 32.5 parts of phthalic anhydride are then added and the material refluxed for about 4½ hours, using a water trap in the condenser. The solution of phenylethyl acid phthalate is then cooled and ammonia gas is passed in with slight agitation for about ½ hour, until precipitation is substantially complete. The precipitated ammonium salt is filtered off and washed with 200 parts of fresh toluene. The washed precipitate is then preferably dried at atmospheric temperature for about 6 hours, and then finally at 75° C., at about 25 inches of vacuum for about ½ hour. The weight of the dried salt is usually about 50 to 52 parts, representing slightly more than double the weight of the original crude phenylethyl alcohol. The salt is then heated with a slight excess of dilute aqueous alkali such as sodium hydroxide until hydrolysis is completed. The mixture separates into an oily layer, removed, washed with water and vacuum distilled. The yield of purified phenylethyl alcohol is usually about 75 to 80% and may even be higher.

Example 2

24.4 parts by weight of crude synthetic phenylethyl alcohol are dissolved in 500 to 600 parts of dry toluene. 32.5 parts of phthalic anhydride are added and material refluxed for about 4½ hours using a water trap in the condenser. The solution of phenylethyl acid phthalate is then cooled and alcoholic caustic potash is added with slight agitation for ½ hour, until precipitation is substantially complete. The precipitated potassium salt is filtered off and washed with 200 parts of fresh toluene. The washed precipitate is then preferably dried at atmospheric temperature for about 6 hours and then finally at 75° C. under about 25 inches of vacuum for about ½ hour. The salt is then heated with a slight excess of diluted aqueous alkali such as sodium hydroxide, until hydrolysis is completed, the mixture separating into an oily layer which is removed, washed with water and vacuum distilled. The yield of purified alcohol is usually about 75% to 80%.

We claim:

1. A method of purifying an alcohol which comprises dissolving the alcohol and impurities in an anhydrous inert organic solvent for both, adding a polybasic organic acid anhydride capable of esterifying the alcohol in sufficient amounts to form monoester, reacting the ester under anhydrous conditions with an anhydrous base capable of forming a salt with the free carboxyl group of the acid, which salt is insoluble in the inert solvent, filtering off the salt, hydrolyzing the ester salt and recovering the alcohol.

2. The process of purifying an alcohol which comprises dissolving the alcohol and impurities in an inert organic solvent for both, adding a dibasic organic acid anhydride to the solution in sufficient amounts to form a half ester with the alcohol reacting the half ester with anhydrous ammonia to form the salt of the half ester, removing the salt from the inert solvent, hydrolyzing the ester salt and recovering the alcohol.

3. The process of purifying an alcohol which comprises dissolving the alcohol and impurities in an inert organic solvent for both, adding a phthalic anhydride to the solution in sufficient amounts to form a half ester with the alcohol, reacting the half ester with anhydrous ammonia to form the salt of the half ester, removing the salt from the inert solvent, hydrolyzing the ester salt and recovering the alcohol.

4. The process of purifying phenylethyl alcohol which comprises dissolving the phenylethyl alcohol in an inert solvent for the alcohol and its impurities, reacting the alcohol with a polybasic organic acid anhydride in amounts insufficient to form the neutral ester, reacting the ester with an anhydrous base to form the salt, filtering off the salt from the inert solvent, hydrolyzing the ester salt and recovering the phenylethyl alcohol.

5. The process of purifying phenylethyl alcohol, which comprises dissolving the phenylethyl alcohol in an inert solvent for the alcohol and its impurities, reacting the alcohol with a polybasic organic acid anhydride in amounts insufficient to form the neutral ester, reacting the ester with an anhydrous base to form the salt, filtering off the salt from the inert solvent, washing with fresh solvent and hydrolyzing the ester salt and recovering the phenylethyl alcohol.

6. The process of purifying phenylethyl alcohol which comprises dissolving the phenylethyl alcohol and its impurities in a liquid aromatic hydrocarbon capable of dissolving both the alcohol and its impurities, reacting the alcohol with an amount of polybasic organic acid anhydride, insufficient to form the neutral ester, reacting the ester with an anhydrous base, filtering off the hydrocarbon solvent from the salt, thus formed, washing the salt with fresh hydrocarbon, hydrolyzing the ester salt and recovering the phenylethyl alcohol.

7. The process of purifying phenylethyl alcohol which comprises dissolving the phenylethyl alcohol in an inert solvent for the alcohol and its impurities, reacting the alcohol with phthalic anhydride in amounts insufficient to form the neutral ester, reacting the ester with an anhydrous base to form the salt, filtering off the salt from the inert solvent, hydrolyzing the ester salt and recovering the phenylethyl alcohol.

8. The process of purifying phenylethyl alcohol which comprises dissolving the phenylethyl alcohol and its impurities in a liquid aromatic hydrocarbon capable of dissolving both the alcohol and its impurities, reacting the alcohol with an amount of phthalic anhydride insufficient to form the neutral ester, reacting the ester with an anhydrous base, filtering off the hydrocarbon solvent from the salt thus formed, washing the salt with fresh hydrocarbon, hydrolyzing the ester salt and recovering the phenylethyl alcohol.

9. A method of purifying phenylethyl alcohol which comprises dissolving the phenylethyl alcohol and its impurities in a benzene hydrocarbon, reacting the phenylethyl alcohol with an amount of phthalic anhydride sufficient to form the half ester, reacting the half ester with an anhydrous nitrogen base, filtering off the hydrocarbon, washing the salt with fresh hydrocarbon, hydrolyzing the ester salt and recovering the phenylethyl alcohol.

10. A method of purifying phenylethyl alcohol which comprises dissolving the phenylethyl alcohol and its impurities in a benzene hydrocarbon, reacting the phenylethyl alcohol with an amount of phthalic anhydride sufficient to form the half ester, reacting the half ester with anhydrous ammonia, filtering off the hydrocarbon, washing the salt with fresh hydrocarbon, hydrolyzing the ester salt and recovering the phenylethyl alcohol.

11. A method of purifying phenylethyl alcohol which comprises dissolving the alcohol and its impurities in a benzene hydrocarbon reacting the alcohol with sufficient phthalic anhydride to form the half ester, reacting the half ester with sufficient anhydrous ammonia to form the insoluble ammonium salt of the half ester, filtering off the hydrocarbon, washing with fresh hydrocarbon, removing the adhering hydrocarbon by evaporation at low temperatures, hydrolyzing the ester salt and recovering phenylethyl alcohol by distillation.

12. A method according to claim 4, in which the phenylethyl alcohol is crude synthetic phenylethyl alcohol obtained by reacting benzene with ethylene oxide in the presence of aluminum chloride.

13. A method according to claim 11, in which the phenylethyl alcohol is crude synthetic phenylethyl alcohol obtained by reacting benzene with ethylene oxide in the presence of aluminum chloride.

14. As a new product, a nitrogen base salt of the half ester of phenylethyl alcohol and phthalic anhydride having the following formula

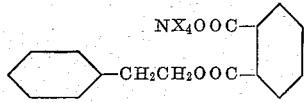

in which X is hydrogen or an organic radical.

15. The process of purifying phenylethyl alcohol, which comprises dissolving the phenylethyl alcohol in an inert solvent for the alcohol and its impurities, reacting the alcohol with a polybasic organic acid anhydride in amounts insufficient to form the neutral ester, reacting the ester with an anhydrous base to form the salt, filtering off the salt from the inert solvent, washing with fresh solvent, and drying under a vacuum.

KENNETH H. KLIPSTEIN.
ARTHUR A. TICKNOR.